United States Patent
Unnewehr

[11] 3,714,533
[45] Jan. 30, 1973

[54] SINE PULSE CONTROLLER FOR VARIABLE RELUCTANCE MOTOR

[75] Inventor: Lewis E. Unnewehr, Birmingham, Mich.

[73] Assignee: Ford Motor Company, Dearborn, Mich.

[22] Filed: March 8, 1971

[21] Appl. No.: 121,653

[52] U.S. Cl. .................313/254, 318/138, 318/439, 321/45 C
[51] Int. Cl. ............................................H02k 29/00
[58] Field of Search.....321/45 C; 318/138, 254, 227, 318/230, 439

[56] References Cited

UNITED STATES PATENTS

| | | | |
|---|---|---|---|
| 3,325,720 | 6/1967 | Stumpe | 321/45 C |
| 3,156,858 | 11/1964 | Reitherman | 318/138 |
| 3,560,820 | 2/1971 | Unnewehr | 318/138 |
| 3,560,817 | 2/1971 | Amato | 318/138 |
| 3,486,096 | 12/1969 | van Cleave | 318/138 |

*Primary Examiner*—G. R. Simmons
*Attorney*—John R. Faulkner and Robert W. Brown

[57] ABSTRACT

Described is a control circuit for the application of direct current electrical energy to the winding of a variable reluctance motor. Brushless operation of the variable reluctance motor is achieved with a capacitor connected in series with the motor winding. A first solid state switching device is connected in parallel with the series combination of the capacitor and motor winding, and a second solid state switching device is connected in series with this parallel combination. A source of electrical energy is connected across the above described elements. A third solid state switching device may be connected in antiparallel with the second solid state switching device. The controller may be used to supply substantially pure half-sine waves to the motor winding.

1 Claim, 6 Drawing Figures

INVENTOR
LEWIS E. UNNEWEHR

BY John R. Faulkner
Robert W. Brown
ATTORNEYS

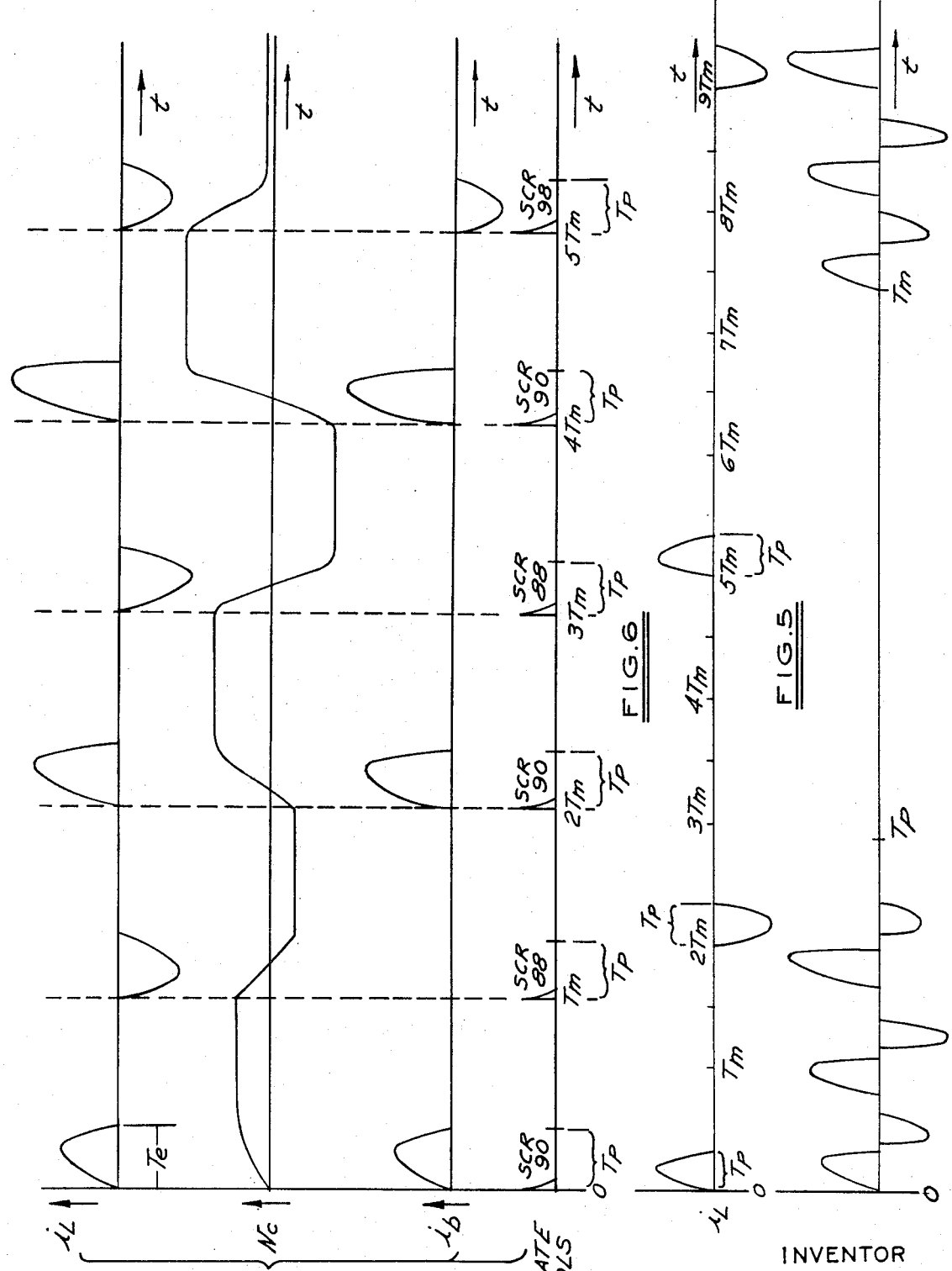

SINE PULSE CONTROLLER FOR VARIABLE RELUCTANCE MOTOR

BACKGROUND OF THE INVENTION

This invention relates to a motor controller. More particularly, it relates to a control circuit for supplying direct current electrical energy to a variable reluctance motor.

The term "variable reluctance motor" as used herein refers to a machine, actuator, or electromechanical transducer which employs a magnetic circuit, in association with one or more exciting windings, and a ferromagnetic armature or rotor and which generates mechanical torque or force which is substantially proportional to the square of the winding ampere-turns and to the time rate of change of permeance (reciprocal of reluctance) as a function of the displacement of the armature or rotor. Typically, these motors employ a stator containing a single motor winding for each phase and a rotor containing ferromagnetic material. Displacement of the rotor relative to this stator produces a variation in reluctance, and hence permeance, of the magnetic circuit of the motor winding. Of course, displacement of the rotor relative to this stator also produces a variation in the self-inductance of the motor winding, this self-inductance being directly related to the permeance of the magnetic circuit.

The torque or force produced by such a variable reluctance motor is proportional to the product of the square of the winding ampere-turns and the rate of change of permeance as a function of rotor displacement. From the preceding, it is apparent that motor torque or force that is positive with respect to some arbitrary reference can only be developed when winding ampere-turns are sustained during an interval in which the permeance increases with rotor displacement. Conversely, negative motor torque or force is developed when winding ampere-turns are sustained during an interval in which the permeance decreases with rotor displacement. Thus, in order to secure continuous rotation of the variable reluctance machine, it is necessary to apply ampere-turns to the motor winding during intervals of increasing permeance and to decrease or eliminate such ampere-turns during intervals of decreasing permeance. The application of ampere-turns during intervals of decreasing permeance results in a braking action.

From the above discussion, it is apparent that the winding of a variable reluctance motor must be excited from a time varying source. Furthermore, the time variations of the source must be synchronized with the mechanical rotation of the machine rotor so that winding current is supplied to the motor during intervals in which the permeance increases with displacement and so that such current is interrupted during intervals in which the permeance is decreasing with displacement. When a time-invariant source of electrical energy, such as a direct current source, is used, a controller is required to produce synchronized pulsations of winding ampere-turns. Hence, operation of a variable reluctance motor requires the use of a controller capable of supplying to the motor winding a current which is periodically interrupted at appropriate rotor positions. Since the developed torque is proportional to the square of the ampere-turns, the controller in principle may supply direct current, alternating current, or a combination of both.

SUMMARY OF THE INVENTION

The controller of the invention couples a direct current source of electrical energy to a variable reluctance motor. The controller is used to regulate the speed and torque of such a motor, and is applicable to variable speed requirements and to many constant speed requirements where conventional AC synchronous machines presently are used. For variable speed applications, a position sensor on the machine rotor is required along with additional electronic circuitry for translating position information into electrical signals. For constant-speed applications where a position sensor is not used, auxiliary motor starting methods are required.

In accordance with the invention, a sine pulse controller for a variable reluctance motor comprises a capacitor connected in series with the motor winding. Connected in parallel with this motor winding and series-connected capacitor is a first solid state switching device. Connected in series with this parallel combination of elements is a second solid state switching device. A direct current source of electrical energy is connected across the combination of the parallel circuit element and the series-connected second solid state switching device. A third solid state switching device may also be provided, this third switching device being connected in antiparallel with the second solid state switching device.

Although the solid state switching devices for the controller circuitry illustrated and described hereinafter are silicon-controlled rectifiers (SCRs), other types of thyristors or three-terminal solid state devices, such as power transistors, triacs, and the like, may also be applicable. The gates or bases of these switching devices are driven by appropriate logic circuitry.

The controller circuitry of the invention provides the complete integration of all commutation circuitry into the motor winding circuitry, the word "commutation" referring to the process for changing a solid state switching device from its conductive state to its nonconductive state. A separate commutation circuit is not required, and current through the circuit's capacitor passes through the motor winding. Also, the controller circuitry permits full range torque and speed control of variable reluctance motors from a fixed voltage source with a minimum number of solid state switching devices. Moreover, simple digital control of RMS current level may be obtained. Another advantage of the controller circuitry is that the sine pulse waveform produced greatly reduces the reluctance motor electromagnetic noise and mechanical vibration usually generated by solid state switching circuits as compared to other types of DC control circuits.

A disc-type variable reluctance motor preferably is used with the controller of this invention. Smooth torque generation is provided by using multiple phases, preferably three or more. Each phase requires a controller. Also, each phase comprises a toroidal winding that surrounds a stator disc having pie-shaped sections of laminated steel spaced by minimum permeance sections usually made of aluminum or reinforced polymeric materials. A rotor disc of similar construction is mounted on each side of the stator disc. The periphery of each rotor is wound with a thin layer of a high strength, low permeance material, such as fiberglass, to increase the maximum potential rotor speed.

In addition to the controller of the invention, the operation of the variable reluctance motor requires the use of logic circuitry. The logic circuitry performs the function of gating or otherwise controlling the operation of the various solid state switching devices included in the controller circuit. The specific design of such logic circuitry depends upon the desired mode or modes of operation of the controller circuitry in view of reluctance motor performance requirements, and, therefore, does not constitute a part of this invention. Moreover, the design of logic circuitry to provide a sequence of gating pulses or the like sufficient to operate the controller circuitry of the invention is within the skill of the art.

In association with the logic circuitry, a position sensor may be connected to the motor shaft. The position sensor may be used to indicate the onset and termination of an interval of increasing magnetic permeance. It may, for example, comprise a disc rotatably attached to the motor shaft, the disc having apertures therein indicative of rotor position which sequentially become aligned with sensing devices, such as light-activated silicon-controlled rectifiers, to cause voltage pulses to be produced indicative of such alignment. Such a voltage pulse from the position sensor would be fed to the logic circuitry to cause it to produce the sequence of pulses that would gate or switch the solid state switching devices of the controller, thereby, to apply DC electrical energy to the motor winding. As is the case with the logic circuitry, the position sensor is not considered to be a part of the present invention. However, suitable position sensing apparatus for a reluctance motor is described in U.S. Pat. application Ser. No. 121,655 and now U.S. Pat. No. 3,673,476 filed concurrently herewith in the name of Douglas R. Hamburg and assigned to the Ford Motor Company.

BRIEF DESCRIPTION OF THE DRAWINGS

FIG. 4 shows current and voltage waveforms for the voltage control mode of operation for the controller circuitry;

FIG. 5 shows winding current waveforms for the multiple pulsing mode of operation for the controller circuitry; and FIG. 6 shows a winding current waveform for a typical pulse skipping mode of operation of the controller circuitry.

DETAILED DESCRIPTION

Figure 1:
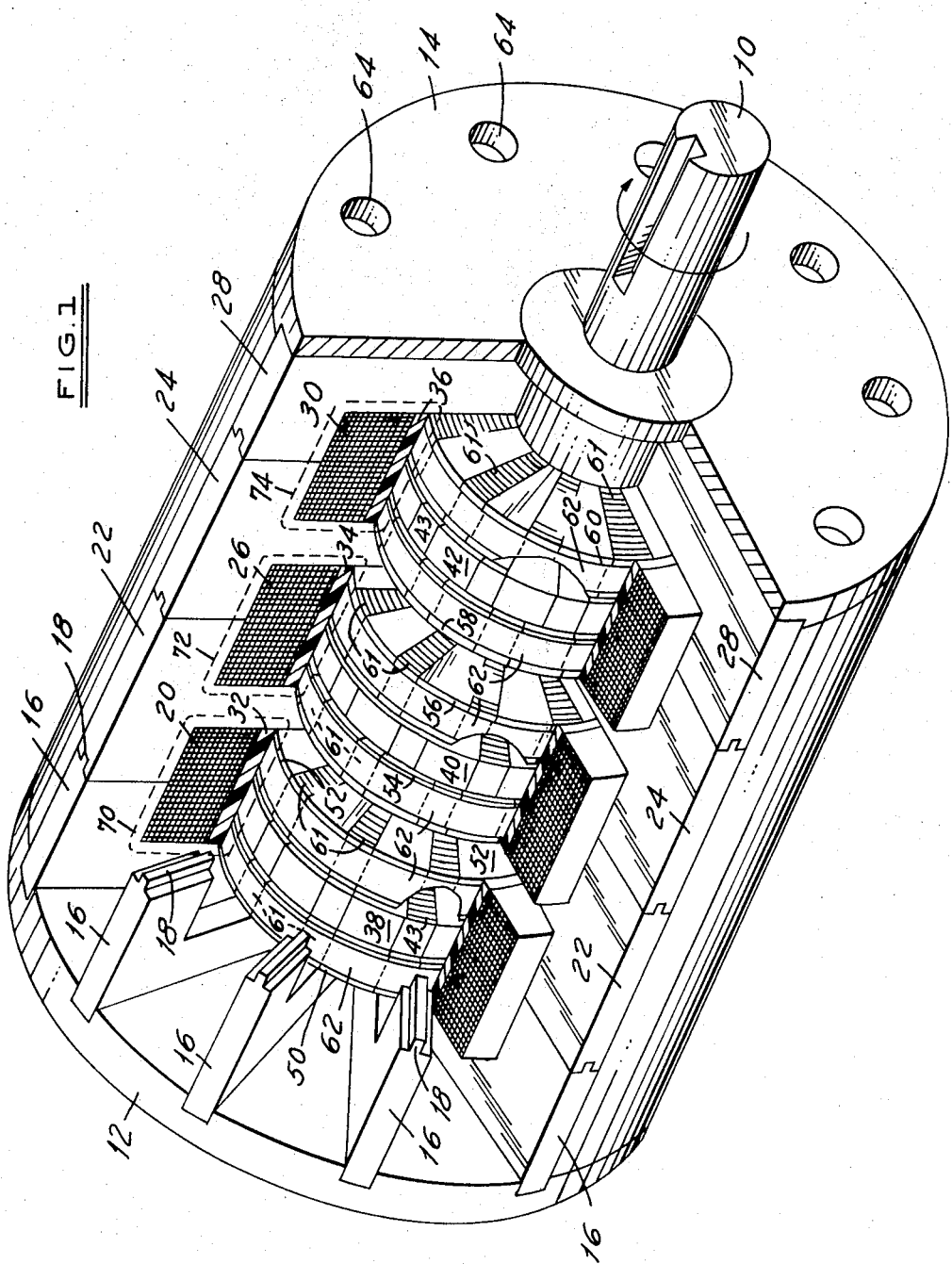
FIG. 1 is a sectional perspective drawing illustrating the construction of a three-phase disc-type variable reluctance motor capable of being used with the controller circuit of the present invention.

FIG. 1 is a sectional view of a disc-type variable reluctance motor. The description of this motor is necessary to facilitate a complete understanding of the controller circuitry of the invention.

With reference now to FIG. 1, a motor shaft 10 is rotatably mounted in two end plates 12 and 14. A plurality of L-shaped members 16 have their longer legs positioned in shallow grooves on the interface of end plate 12. The shorter legs of member 16 project axially inward with the outer surfaces thereof at the approximate level of the outer periphery of end plate 12. Members 16 are made of laminated steel with the laminations running parallel to the shaft axis and have small radially directed tongues 18 at the inner surfaces of the shorter legs.

A helically-wound, toroidally-shaped first phase winding 20 has one-half of its width fitting into the steps of L-shaped members 16 and is held in place by a plurality of T-shaped members 22. Members 22 have a groove cooperating with tongue 18. Similar T-shaped members 24 hold the winding 26 of the second phase in place against members 22 and L-shaped members 28 cooperate with T-shaped members 24 to hold the winding 30 of the third phase in place. Members 22, 24, and 28 also are made of laminated steel.

Rims 32, 34, and 36 of fiberglass are positioned against the radially interior surfaces of respective windings 20, 26, and 30 and are connected to the outer peripheries of respective stator discs 38, 40, and 42. Each stator disc comprises a plurality of pie-shaped laminated steel sections 43 separated by a material having a low magnetic permeance, such as aluminum or a reinforced phenolic resin. The number of sections 43 in each disc corresponds to the number of L-shaped members 16, and the sections in each stator disc are aligned with members 16.

Rotor discs 50 and 52 are fastened to shaft 10 and positioned on each side of stator disc 38 to complete the first phase of the motor. Similarly, rotor discs 54 and 56 are positioned on each side of stator disc 40, and rotor discs 58 and 60 are positioned on each side of stator disc 42, to complete the second and third phases. Each rotor disc also has pie-shaped sections 61 of laminated steel surrounded by sections of low permeance material. In a three phase motor, the laminated sections of both the stator discs and the rotor discs have a peripheral width approximately corresponding to the width of members 16 and are surrounded on each side by twice this width of the lower permeance material.

A narrow groove is cut into the periphery of each rotor disc. This groove is filled with a high strength layer of fiberglass 62. Laminated sections 61 of the rotor disc in each phase are aligned with each other. Additionally, laminated sections of the rotor disc in the second phase are spaced perpherally by the width of a section from the laminated sections of the rotor disc in the first phase, and the laminated sections of the rotor disc in the third phase are spaced in the same direction by the width of a laminated section from the corresponding sections of the rotor disc in the second phase. Thus, when sections 61 of rotor discs 50 and 52 are aligned with sections 43 of stator disc 38, sections 61 of rotor discs 54 and 56 are aligned with imaginary sections of stator disc 40 adjacent its laminated sections, and sections 61 of rotor discs 58 and 60 are aligned with imaginary sections of stator disc 42 adjacent its laminated sections but located on the sides opposite the imaginary sections of disc 40. Long bolts pass through appropriate holes 64 in end plates 12 and 14 to clamp the parts of the motor together.

The magnetic flux paths are illustrated, respectively, by broken lines 70, 72, and 74. An interval of increasing magnetic permeance for these flux paths begins approximately at the time that the front edges of the laminated rotor sections 61 first begin to come into axial alignment with the stator sections 43 of the motor. In FIG. 1, in which clockwise rotation of the shaft 10 is assumed, the rotor sections 61 of the third phase are at the point at which the magnetic permeance is just beginning to increase as the result of the approaching alignment of the rotor sections 61 with the stator laminated sections 43. The permeance continues to increase until the laminated sections 61 of the rotor are in full alignment with the laminated sections 43 of the stator, at which point the permeance begins to decrease. In order to produce positive motor torque, the controller circuitry of the invention must apply winding current to the phase during the interval of increasing magnetic permeance, and if motor braking is to be prevented, this winding current must be interrupted before the magnetic permeance begins to decrease as the rotor and stator laminated sections begin to move out of alignment. As was earlier stated, winding current during the interval of decreasing permeance produces negative torque and a braking action, which is undesirable except where a reduction in motor speed and/or a conversion of mechanical energy to electrical energy (regenerative braking) is considered advantageous.

Figure 2:
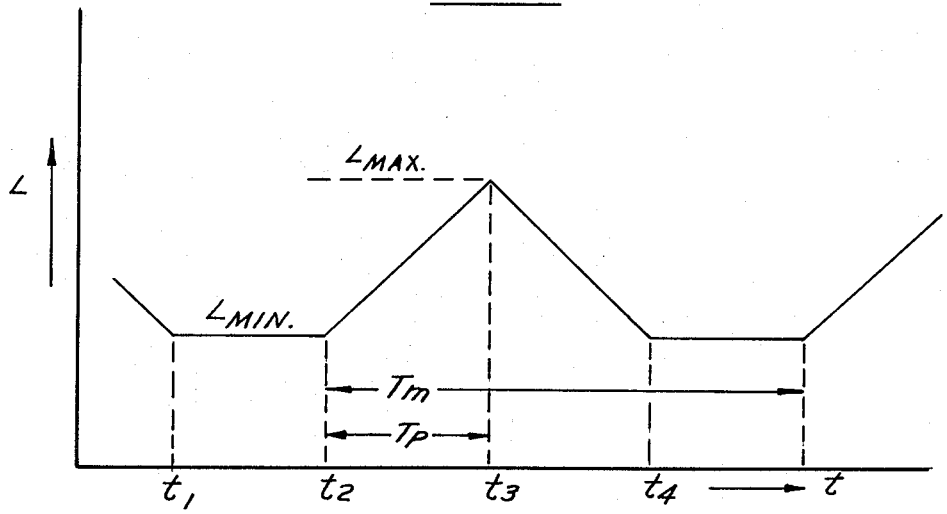
FIG. 2 is a graph illustrating the time variance of the motor winding inductance of a variable reluctance motor.

With particular reference now to FIG. 2 which illustrates the variation of the motor winding inductance L with time $t$, the periodic manner in which the winding inductance varies as a consequence of the similarly varying magnetic permeance is shown. In the interval from $t_1$ to $t_2$, the magnetic permeance, and, hence, winding inductance, are substantially constant until the front edge of the laminated sections of the machine rotor approach the back edge of the laminated sections of the machine stator. At this point, the magnetic permeance and winding inductance begin to increase. This occurs in the time interval from $t_2$ to $t_3$. At the time $t_3$, the laminated sections of the rotor and stator begin to move out of alignment and the magnetic permeance and winding inductance begin to decrease. This continues until the time $t_4$, and then a period of substantially constant inductance again takes place, after which the cyclical intervals of increasing and decreasing inductance are repeated. The time interval in which the magnetic permeance increases, and during which positive torque may be produced if the motor winding is supplied with current, is labeled $T_p$. If winding current is applied during the interval from $t_3$ to $t_4$, then negative torque is produced. The time period identified as $T_m$ is the mechanical period of the machine. The relative magnitude of these periods and of the maximum inductance and minimum inductance of the motor winding are determined by the mechanical design of the machine and are adjusted by the machine designer to satisfy specific performance requirements.

The time duration of the mechanical period $T_m$ and of the interval of increasing magnetic permeance and inductance $T_p$ depend upon the speed of rotation of the motor. At constant rotor speed, these time intervals are constant, but as the rotor speed increases, they necessarily decrease. It should be understood that as motor speed increases, the time interval of the increasing magnetic permeance and positive torque possibility decreases and that as a result there is less time available in which to perform the various solid state switching functions that produce winding current by the application to it of DC electrical energy. Therefore, in many applications it is necessary to use one mode of operation for the controller circuitry at low speed, to use another mode of operation at higher speeds, and to use still other modes of operation at even higher speeds.

Figure 3:
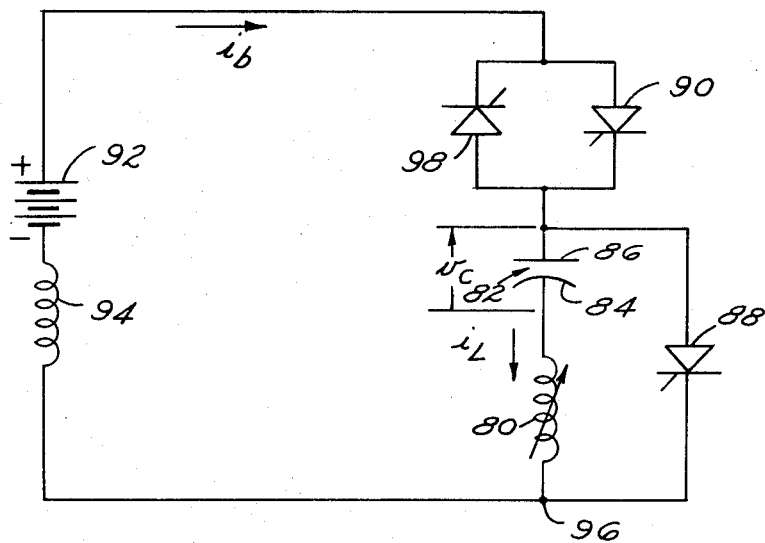
FIG. 3 is a schematic diagram of the controller circuitry of the invention.

With reference now to FIG. 3, there is shown a schematic diagram of controller circuitry constructed in accordance with the invention. The circuit includes a motor winding 80 of a variable reluctance motor, this motor winding having an inductance which varies in the manner previously described. If the motor has multiple phases, then winding 80 represents the winding of one of the phases. A capacitor 82, having a first terminal 84 and a second terminal 86, is connected in series with the motor winding 80. Connected in parallel with the series combination of the capacitor 82 and the motor winding 80 is a first solid state switching device in the form of an SCR 88. The anode of the SCR 88 is connected to the terminal 86 of the capacitor and the cathode of the SCR 88 is connected to one terminal of the motor winding 80.

A second solid state switching device, SCR 90, is connected in series with the combination of parallel elements described in the preceding paragraph. The cathode of the SCR 90 is connected to the terminal 86 of the capacitor 82, while the anode of the SCR 90 is connected to a direct current source of electrical energy in the form of a storage battery 92 having an inherent inductance 94. The negative terminal of the storage battery 92 is connected at 96 to the motor winding 80 and the cathode of the SCR 88. The direct current source of electrical energy thus is connected across the series combination of the SCR 90 and the parallel circuit formed by the capacitor 82, the motor winding 80, and the SCR 88. The instantaneous magnitude and direction of the battery current is designated by an arrow and the letters $i_b$. Similarly, the current through the motor winding 80 is designated in magnitude and direction by the letters $i_L$ and an arrow. Also, the voltage across the capacitor 82 is indicated by the symbol $v_C$, the arrow associated therewith indicating the assumed positive polarity for the capacitor 82.

In the preferred form of the invention, a third solid state switching device in the form of an SCR 98 is provided. The SCR 98 is connected in antiparallel with the second solid state switching device, SCR 90.

OPERATION

The controller circuitry of the invention has two functions: to excite the motor synchronously, that is, to supply winding ampere-turns for motor operation during intervals of increasing magnetic permeance; and to vary the torque developed by the reluctance motor in response to the load demands. In variable speed applications, the first function requires that some form of position sensor be used to provide the logic system that controls the operation of the solid state switching devices with information describing the inductance variations of the motor winding. The position sensor used for this purpose may be digital or analog and may be relatively simple and inexpensive. The second function, the control of the torque developed by the variable reluctance motor, is largely a matter of controlling the RMS current in the motor winding. As was previously stated, the developed torque of a variable reluctance motor is proportional to the square of the winding RMS current.

There are several ways in which the winding RMS current may be controlled. One of these methods is to control the voltage on the capacitor 82 of FIG. 2. Also, winding RMS current may be controlled by applying a multiplicity of pulses to the winding during intervals of increasing inductance for motor operation or decreasing inductance for generator operation. Furthermore, RMS current control may be effected by pulse skipping or by pulse shifting. These current and torque control methods are described in detail in the paragraphs which follow.

Capacitor Voltage Control

Waveforms of the winding current, the capacitor voltage, the battery current, and the SCR gate signals are shown in FIG. 4 for the capacitor voltage control method of operation for the controller circuitry of FIG. 3. It is assumed that the capacitor 82 is initially uncharged. A gating pulse from the logic circuitry is then applied to the SCR 90, which becomes conductive. Charge flows out of the battery 92, through the SCR 90, through the capacitor 82, and through the motor winding 80 back to the storage battery 92. This is a series circuit and the battery current $i_b$ is equal to the winding current $i_L$, as shown in FIG. 4. This series circuit is an LC circuit including the battery inductance 94, the winding inductance 80, and the capacitance of the capacitor 82, the circuit having some inherent amount of damping. As a result of the flow of charge, the capacitor 82 attains a voltage somewhat less than twice the battery potential with the terminal 86 thereof being positive with respect to the terminal 84. The current pulse has the shape of a half-sine wave. Oscillation in the LC circuit cannot take place because the SCR 90 becomes reverse-biased and self-commutates.

The time interval in which this half-sine wave pulse occurs or, in other words, the pulse width, designated $T_e$ in FIG. 4, is determined by the circuit parameters. In FIG. 4, the pulse width $T_e$ is shown as occupying the entire interval of increasing magnetic permeance $T_p$. In practice, the elements of the FIG. 3 circuit would be chosen such that this electrical period or pulse width $T_e$ would be equal to the interval of increasing magnetic permeance $T_p$ at the highest speed at which the variable reluctance motor is to operate. Of course, at reduced speeds, the electrical pulse width $T_e$ remains substantially constant, but the time interval $T_p$ increases because of the reduced speed. The electrical pulse width $T_e$ does vary somewhat as a function of the motor speed, but this variation is small and the circuit parameters, including the maximum and minimum inductances of the motor winding, the capacitance, and the inductance of the battery source of electrical energy, are determinative of the pulse width.

The current pulses that are produced in the circuit of FIG. 3 are pure half-sine pulses at zero speed. However, when the rotor is turning, the winding inductance L is a time varying parameter and the resulting current pulse waveform is exactly described by Bessel functions of the first and second kinds. At very low speeds, these pulses remain indistinguishable from pure half-sine waves. At high speeds, these pulses appear as slightly damped half-sine pulses.

It was stated previously that at the end of the first half-sine pulse the SCR 90 self-commutates. This preferably occurs at or before the end of the first interval of increasing winding inductance. At the beginning of the second interval of increasing winding inductance, a gating pulse is applied to the SCR 88 to render it conductive. The capacitor 82, having acquired a positive charge on its terminal 86, discharges through the SCR 88 and the winding 80 producing useful motor torque and causing the terminal 84 of the capacitor 82 to acquire a positive charge with respect to the terminal 86. This may be seen in FIG. 4. The voltage $v_C$ is somewhat reduced from its magnitude prior to charge reversal and may attain a value of, for example, one and one-half times the battery potential. The pulse is again a half-sine pulse which terminates as the SCR 88 becomes reverse-biased and self-commutates. It should be noted that the electrical time $T_e$ for this pulse may be slightly less than for the previous pulse because the source inductance 94 is not in the loop when the SCR 88 is conducting.

At the beginning of the next interval of increasing winding inductance, that is, at the time $t = 2 T_m$ in FIG. 4, a gating pulse again is applied to the SCR 90. At this time, the battery source and capacitor voltages are aiding one another and, hence, the current pulse magnitude in the winding 80 may, for example, be about 2.5 times that of the first current pulse. Also, the capacitor 82 is further charged from the battery during this pulse so that its upper terminal 86 acquires a positive charge, the voltage on the capacitor then being, for example, about 3.5 times the source potential.

A gating pulse is again applied to the SCR 88 to render it conductive. A useful winding current pulse is present in the circuit formed by the battery source 82, the SCR 88, and the motor winding 80. This begins at the time $t = 3 T_m$ in FIG. 4.

This cyclical gating of the SCRs 90 and 88 to produce winding current pulses is continued during subsequent intervals of increasing winding inductance to produce positive motor torque. These subsequent cycles are not shown in FIG. 4, but it should be understood that continued alternate gating of the SCRs 90 and 88 gradually increases, in progressively smaller increments, the voltage on the capacitor 82 at the end of the current pulses. A steady state voltage is achieved after about 10 to 20 pulses, and this voltage may have a peak value of about 5 to 8 times the source potential. When a steady state voltage is attained, the current pulse obtained when the SCR 90 is gated is identical in magnitude to the current pulse obtained when the SCR 88 is gated. This means that the aiding battery source voltage and voltage across the capacitor 82, at the beginning of the current pulse which occurs when the SCR 90 is gated, is exactly equal to the voltage across the capacitor at the beginning of the interval during which the SCR 88 is gated.

The steady state voltage described above provides the maximum single pulse current rating obtainable from a given battery source potential. To operate at current levels below this maximum, the capacitor voltage can be reduced by returning some or all of its energy to the source through the SCR 98. This operation must follow a current pulse produced by gating the SCR 90 and is possible only if the capacitor voltage exceeds the battery source potential, the upper terminal 86 of the capacitor 82 being positive with respect to the lower terminal 84 thereof. When a gating pulse is applied to the SCR 98 to render it conductive at the beginning of an interval of increasing winding inductance, a useful half-sine current pulse is again present in the winding circuit including the capacitor 82, the SCR 98, and the battery source 92. The capacitor voltage after this pulse will have decreased to a fraction of the source potential with the upper terminal 86 of the capacitor 82 retaining a positive potential with respect to the lower terminal 84 thereof. FIG. 4, at the time $t = 5\ T_m$, shows this current pulse and the capacitor voltage at the end of the pulse.

When the SCR 90 is gated following the application of a gating pulse to the SCR 98 as described above, the capacitor 82 will charge to a voltage lower in magnitude than if the capacitor were initially completely discharged as previously described because the capacitor voltage $v_C$ after the current pulse produced by gating the SCR 98 opposes the source potential. Continued alternate gating of the SCRs 90 and 98 causes the controller circuitry to become inoperative because the capacitor voltage at the beginning of the gating pulse applied to the SCR 90 reaches a value equal to the source potential. At this time, the source potential and capacitor voltage is equal to zero and the current pulse magnitude is also zero.

In another SCR gating sequence, the SCR 90 is first gated, and then the SCR 98 is gated, this being followed by gating of the SCR 88. Repeatedly gating these SCRs in this sequence produces a steady state voltage condition.

In the preceding paragraphs, three sequences have been described for applying gating pulses to the SCRs 88, 90, and 98. These sequences are: a gating pulse applied to the SCR 90 at the beginning of an interval of increasing winding inductance followed by a gating pulse applied to the SCR 88 at the beginning of the next interval of increasing winding inductance, this sequence being repeated many times until a steady state voltage of about six times the source potential is attained on the capacitor 82; a gating pulse applied to the SCR 90 at the beginning of an interval of increasing winding inductance followed by a gating pulse applied to the SCR 98 at the beginning of the next interval of increasing winding inductance, this sequence being repeated many times until a steady state voltage of about zero across the capacitor 82 is obtained; and a gating pulse applied to the SCR 90 at the beginning of an interval of increasing winding inductance followed by a gating pulse applied to the SCR 98 at the beginning of the next interval of increasing winding inductance followed by a gating pulse applied to the SCR 88 at the beginning of the next interval of increasing winding inductance, this sequence being repeated many times until a steady state voltage of about twice the source potential is attained across the capacitor 82. These three sequences, which lead to different steady state voltages, may be applied for different time intervals to a given motor winding. The relative duration of each of the sequences used determines the motor RMS current. For example, one might alternately gate the SCRs 90 and 88 over a first time interval, then alternately gate the SCRs 90 and 98 over a following second time interval, and finally gate the SCRs 90, 98, and 88 over a subsequent third time interval. The length of the first, second, and third time intervals, respectively, determines the RMS current in the winding of the variable reluctance motor. Thus, the controller circuitry of the invention may be used to provide digital voltage control of a variable reluctance motor.

Multiple Pulsing Operation

At low machine speeds, the electrical period $T_e$ is usually a small fraction of the usable mechanical interval of increasing winding inductance $T_p$. Therefore, to achieve a reasonable RMS current, the peak current would have to be undesirably large from the standpoint of resistive power loss and device current ratings. This difficulty can be overcome by the use of multiple half-sine pulses during a single interval of increasing winding inductance. A possible current waveform having multiple pulses applied during a single interval of increasing winding inductance is shown in FIG. 5. From FIG. 5, it may be seen that each of the intervals of increasing winding inductance contains six half-sine pulses.

The SCR gating sequences previously described in connection with voltage control operation of the FIG. 3 circuitry may be used in multiple pulsing to achieve further current control. In multiple pusling, the time spaces required between the individual pulses is limited primarily by the switching time of the various solid state devices in the controller circuitry.

Pulse Skipping Operation

Another possible method for achieving winding current control, particularly at high motor speeds, is to skip one or more pulses per revolution of the motor rotor. A possible pulse skipping waveform is illustrated in FIG. 6. A half-sine pulse is applied at time $t = 0$. This is the beginning of the interval of increasing winding inductance, and the total cyclical winding inductance variation is completed at the time $T_m$, at which time another interval of increasing winding inductance begins. In FIG. 6, it may be seen that no pulse is applied at time $T_m$, but a pulse is again applied at time $2\ T_m$. Following this, two more pulses are skipped, that is, at times $3\ T_m$ and $4\ T_m$. At time $5\ T_m$, a pulse is again applied. Following this, three pulses are skipped, the next pulse being applied at $9\ T_m$. This pulse skipping sequence may then be repeated.

Pulse Shifting Torque Control

Another limited form of torque control is to shift the electrical pulse partially out of the interval of increasing winding inductance. For example, with reference to FIG. 2, if a current pulse for motoring action were shifted from the interval between $t_2$ and $t_3$ partially into the interval from $t_1$ to $t_2$, the RMS current would be unchanged, but developed torque would be reduced since current in the inductance period between $t_1$ and $t_2$ produces no torque.

Based upon the foregoing description of the invention what is claimed and desired to be protected by Leters Patent is:

1. In a variable reluctance motor having a winding that has a varying inductance during motor operation, a circuit for controlling the application of electrical energy to said winding, which comprises: a direct current source of electrical energy having a first terminal connected to one end of said winding and having a second terminal; a capacitor having first and second terminals, said first terminal being connected to the other end of said winding; a first thyristor having an anode and a cathode, said anode being connected to said second terminal of said capacitor and said cathode being connected to said one terminal of said winding, said first thyristor thus being connected in parallel with said capacitor and said winding; a second thyristor having an anode and a cathode, said second thyristor anode being connected to said second terminal of said source of electrical energy, and said second thyristor cathode being connected to said second terminal of said capacitor; and a third thyristor having an anode and a cathode, said anode of said third thyristor being connected to said cathode of said second thyristor, and said cathode of said third thyristor being connected to said anode of said second thyristor, said third thyristor thereby being connected in anti-parallel with said second thyristor.

* * * * *